Patented Apr. 18, 1933

1,903,857

UNITED STATES PATENT OFFICE

OTTO BAYER, OF FRANKFORT-ON-THE-MAIN, AND FRITZ BAUMANN, OF LEVERKUSEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE ANTHRAPYRIDONE AND THE ANTHRAPYRIMIDONE SERIES

No Drawing. Application filed January 5, 1931, Serial No. 506,832, and in Germany January 15, 1930.

Our invention relates to new vat dyestuffs corresponding probably to the general formula:

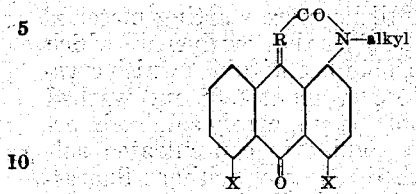

wherein R means CH or N and one X hydrogen and the other X the grouping

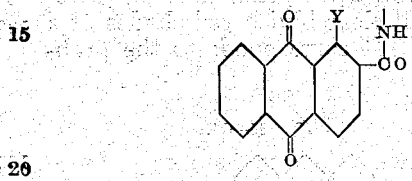

in which the anthraquinone residue may contain an aminogroup in the position signified by Y. The present new dyestuffs are when dry yellow to bluish red crystalline substances, which are scarcely soluble in organic solvents, and dye the vegetable fiber from a reddish to brownish vat yellow to bluish red shades of an excellent fastness, which shades are distinguished by a greater deepening and intensity than is shown by the products prepared from anthraquinone-2-carboxylic acid halides and amino-anthraquinones. The fact that the new dyestuffs are soluble in the vat to the usual degree is very surprising in view of the presence of the not vattable pyridone and pyrimidone residue respectively.

The new dyestuffs are obtained by condensing an anthraquinone-2-carboxylic acid halide or a nuclear substitution product thereof containing an aminogroup with a N-alkylanthrapyridone or -anthrapyrimidone derivative containing an aminogroup attached to the 4- or 5-position of the anthraquinone nucleus. The condensation reaction is advantageously carried out in the presence of a suitable diluent such as nitrobenzene or trichlorobenzene.

When using as a component of condensation aminopyridone and aminopyrimidone compounds not N-alkylated, the dyestuffs corresponding to the aforesaid general formula are obtained by subsequent alkylation.

In order to further illustrate our invention the following examples are given, the parts being by weight and all temperatures in centigrade degrees, but it is, however, to be understood, that our invention is not limited to the particular products nor reacting conditions mentioned therein:—

Example 1

50 parts of 4-amino-1.9-(1'-methyl)-anthrapyridone are mixed with about 800 parts of nitrobenzene, the mixture is heated at about 200° and then 50 parts of anthraquinone-2-carboxylic acid chloride are added. When the evolution of hydrochloric acid gas has ceased the separated crystalline condensation product is filtered off and washed out with alcohol. It dyes cotton golden yellow shades of a good fastness. The new dyestuffs correspond probably to the formula:

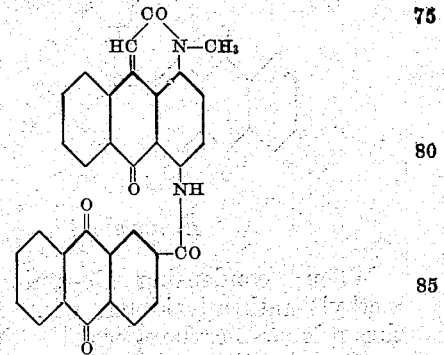

Example 2

When replacing in Example 1 the anthraquinone-2-carboxylic acid chloride by the corresponding quantity of 1-amino-anthraquinone-2-carboxylic acid chloride a dyestuff is obtained, which dyes cotton from a reddish brown vat strong red shades of a remarkable fastness to kier boiling, to light and to chlorine. The new dyestuff corresponds probably to the formula:

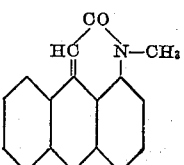
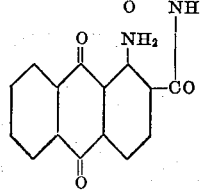

*Example 3*

30 parts of 5-amino-1.9-(1'-methyl)-anthrapyridone (which crystallizes from glacial acetic acid as orange red neddles, which melt above 300° and dissolve in sulfuric acid with a yellow orange color) are mixed with about 500 parts of technical o-dichlorobenzene and 30 parts of anthraquinone-2-carboxylic acid chloride and the mixture is heated to boiling until the evolution of hydrochloric acid has ceased. Then the separated crystalline condensation product is filtered off at about 100° and washed out with alcohol. The new dyestuff dyes cotton from a reddish brown vat greenish yellow shades and corresponds probably to the formula:

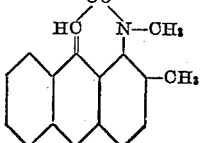
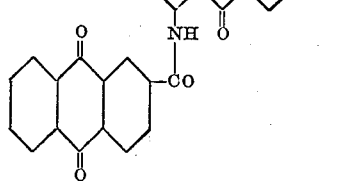

*Example 4*

When condensing 5-amino-1.9-(1'-methyl)-anthrapyridone with 1-aminoanthraquinone-2-carboxylic acid chloride in the manner described in the foregoing examples a new dyestuff is obtained which dyes cotton from a brownish red vat brick-red shades of a good fastness. The new dyestuff corresponds to the probable formula:

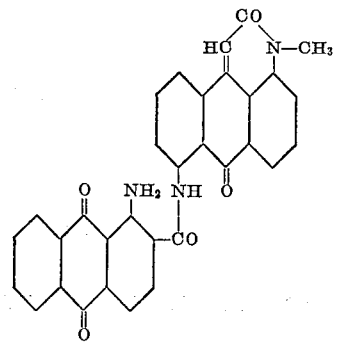
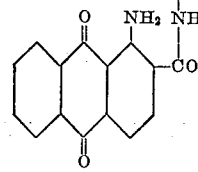

*Example 5*

30 parts of 4-amino-N-methyl-1.9-anthrapyrimidone are introduced into about 500 parts of nitrobenzene. The mixture is dehydrated by heating at 180° in an open vessel for some time. Then at about 120° 34 parts of 1-aminoanthraquinone-2-carboxylic acid chloride are added and the mixture is heated at 160–170° until no more starting material can be detected. Then the new dyestuff which separates in form of beautiful brownish crystals is filtered off at about 120° and washed out with alcohol. It is scarcely soluble in organic solvents, soluble in concentrated sulfuric acid with a red color without fluorescence; by pouring the solution on water the dyestuff is precipitated as bluish red flakes. The new dyestuff dyes cotton from a brownish red vat full clear bluish red shades of a good fastness. It corresponds to the probable formula:

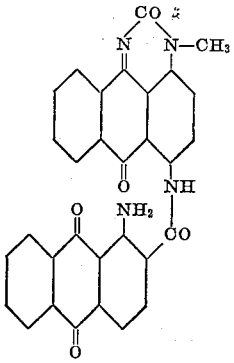
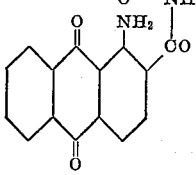

The 4-amino-N-methyl-1.9-anthrapyrimidone used for the condensation may be obtained by treating 1-methylamino-4-benzoylamino-anthraquinone with urea and by subsequently splitting off the benzoyl-group according to U. S. Patent 928,891. The compound represents a substance crystallizing as bluish red needles. It dissolves in sulfuric acid with an orange red color and a yellow fluorescence, in pyridine with a bluish red color and a likewise yellow fluorescence.

*Example 6*

28 parts of anthraquinone-2-carboxylic acid are transformed into the chloride by heating it with the same quantity of thionylchloride with addition of about 500 parts of nitrobenzene. The excess of thionylchloride is removed by distillation in vacuo. Then at about 120° 25 parts of 4-amino-1.9-anthrapyrimidone are added and the mixture is heated at about 200° until the reaction is finished. The condensation product is filtered off at about 100°. When dry it represents an orange brown compound soluble in sulfuric acid with a yellow brown color and strongly attacked by the action of an alkali. By methylating it with p-toluene-sulfonic methylic ester with addition of a sodium carbonate solution the orange red N-methyl-1.9-anthrapyrimidone - 4 - anthraquinone-β-carboxylic acid amide is formed. It corresponds to the probable formula:

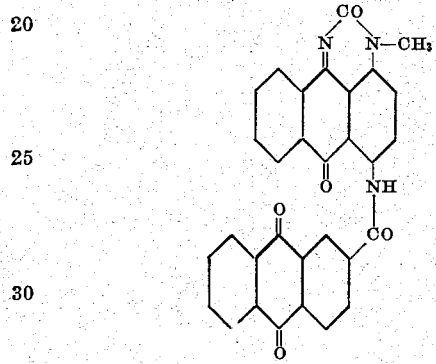

and dyes cotton reddish orange shades.

Example 7

When replacing in the foregoing example the 4-amino-N-methyl-1.9-anthrapyrimidone by the isomeric 5-amino compound a dyestuff is formed, which dyes cotton from a red vat red shades and corresponds to the probable formula:

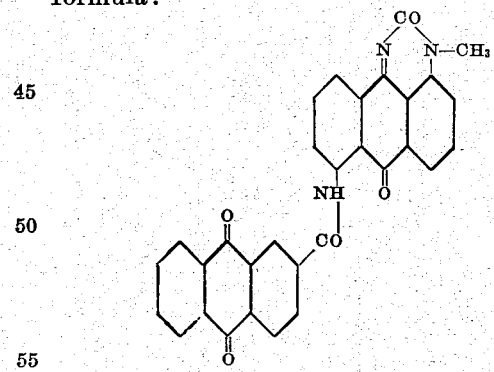

We claim:—
1. Vat dyestuffs corresponding probably to the general formula:

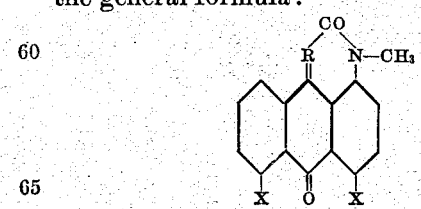

wherein R means CH or N and one X hydrogen and the other X the grouping

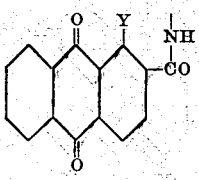

in which the anthraquinone radical may contain an aminogroup in the position signified by Y, which new dyestuffs are when dry yellow to bluish red crystalline substances, which are scarcely soluble in organic solvents, and dye the vegetable fiber from a reddish to brownish vat yellow to bluish red shades of a good fastness.

2. Vat dyestuffs corresponding probably to the general formula:

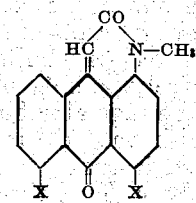

wherein one X means hydrogen and the other X the grouping:

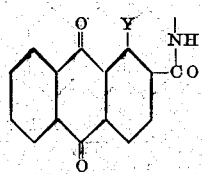

in which the anthraquinone radical may contain an aminogroup in the position signified by Y, which new dyestuffs are when dry yellow to bluish red crystalline substances, which are scarcely soluble in organic solvents and dye the vegetable fiber from a reddish to brownish vat yellow to bluish red shades of a good fastness.

3. The vat dyestuff of the probable formula:

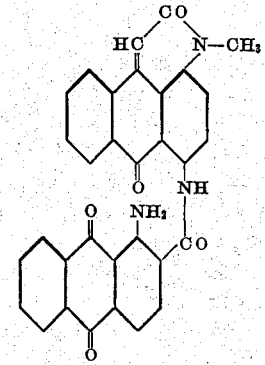

which dyestuff dyes cotton from a reddish brown vat full red shades.

4. The vat dyestuffs of the probable formula:

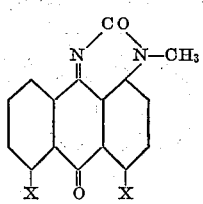

wherein one X means hydrogen and the other X the grouping:

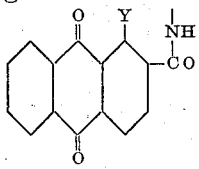

in which the anthraquinone radical may contain an aminogroup in the position signified by Y, which new dyestuffs are when dry yellow to bluish red crystalline substances, which are scarcely soluble in organic solvents and dye the vegetable fiber from a reddish to brownish vat yellow to bluish red shades of a good fastness.

5. The vat dyestuff of the probable formula:

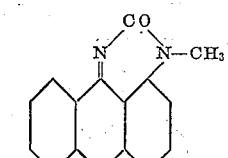
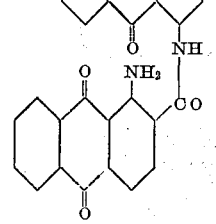

which dyestuff dyes cotton from a brownish red vat full clear bluish red shades.

In testimony whereof, we affix our signatures.

OTTO BAYER.
FRITZ BAUMANN.